United States Patent
Bagepalli et al.

[19]

[11] Patent Number: 6,042,119
[45] Date of Patent: *Mar. 28, 2000

[54] WOVEN SEALS AND HYBRID CLOTH-BRUSH SEALS FOR TURBINE APPLICATIONS

[75] Inventors: Bharat S. Bagepalli, Schenectady; Robert H. Cromer, Gloversville; Osman S. Dinc, Troy; James Maynard, Clifton Park, all of N.Y.

[73] Assignee: General Electric Co., Schenectady, N.Y.

[ * ] Notice: This patent is subject to a terminal disclaimer.

[21] Appl. No.: 08/856,291

[22] Filed: May 14, 1997

Related U.S. Application Data

[62] Division of application No. 08/438,228, May 9, 1995, which is a division of application No. 08/342,011, Nov. 16, 1994, Pat. No. 5,474,306, which is a continuation of application No. 07/978,731, Nov. 19, 1992, abandoned.

[51] Int. Cl.[7] .................................................. F16J 15/447
[52] U.S. Cl. ............................................................ 277/355
[58] Field of Search ............................................. 277/355

[56] References Cited

U.S. PATENT DOCUMENTS

| | | |
|---|---|---|
| 768,593 | 8/1904 | Emmet et al. . |
| 779,785 | 1/1905 | Junggren . |
| 910,472 | 1/1909 | Junggren . |
| 957,887 | 5/1910 | Junggren . |
| 980,282 | 1/1911 | Junggren . |
| 1,352,277 | 9/1920 | Junggren . |
| 1,352,278 | 9/1920 | Junggren . |
| 1,505,647 | 8/1924 | Junggren . |
| 1,505,924 | 8/1924 | Warren . |
| 1,536,014 | 5/1925 | Junggren . |
| 1,594,838 | 8/1926 | Këgresse . |
| 1,651,855 | 12/1927 | Warren . |
| 1,670,071 | 5/1928 | Junggren . |
| 1,895,930 | 11/1933 | Junggren . |
| 2,336,323 | 12/1943 | Warren . |
| 2,600,991 | 6/1952 | Hargrove . |
| 2,709,338 | 5/1955 | Morley et al. . |
| 3,186,168 | 6/1965 | Ormerod et al. . |
| 3,463,498 | 8/1969 | Bill . |
| 3,759,038 | 9/1973 | Scalzo et al. . |
| 4,195,476 | 4/1980 | Wood . |
| 4,202,554 | 5/1980 | Snell . |
| 4,358,120 | 11/1982 | Moore . |
| 4,415,309 | 11/1983 | Atterbury . |
| 4,422,288 | 12/1983 | Steber . |
| 4,541,741 | 9/1985 | Woodbridge et al. . |
| 4,567,730 | 2/1986 | Scott . |
| 4,580,346 | 4/1986 | Reichl . |
| 4,730,876 | 3/1988 | Werner et al. . |
| 4,756,536 | 7/1988 | Belcher . |

(List continued on next page.)

FOREIGN PATENT DOCUMENTS

| | | |
|---|---|---|
| 0453315 A1 | 10/1991 | European Pat. Off. . |
| 2938-484 | 3/1981 | Germany . |
| 421302 | 5/1947 | Italy . |
| 3-209068 | 9/1991 | Japan . |
| 2 191 825 | 12/1987 | United Kingdom . |
| WO92/05378 | 4/1992 | WIPO . |

OTHER PUBLICATIONS

Positive Pressure Variable Clearance Packing, Morrison et al.,; GE Turbine Reference Library, May 1990.

*Primary Examiner*—Anthony Knight
*Assistant Examiner*—John L. Beres
*Attorney, Agent, or Firm*—Nixon & Vanderhye

[57] ABSTRACT

A seal is provided between relatively moving parts 12, 14 and includes plural layers 24 of woven material such as metal, polymer or ceramic materials. The layers are secured to one another and to a first part 22 of the relatively moving first and second parts and extend freely from that first part into engagement with the second part. The woven material layers accommodate shape variations between the parts. In a further form, bristles 38 are disposed between layers of woven material and secured at one end to one part. The free ends of the bristles and the free marginal portion of the woven material project toward the second part in sealing engagement therewith.

10 Claims, 6 Drawing Sheets

U.S. PATENT DOCUMENTS

| | | |
|---|---|---|
| 4,781,388 | 11/1988 | Wörhl et al. . |
| 4,785,623 | 11/1988 | Reynolds . |
| 4,809,990 | 3/1989 | Merz . |
| 4,901,522 | 2/1990 | Commaret et al. . |
| 4,971,336 | 11/1990 | Ferguson . |
| 4,989,886 | 2/1991 | Rulis . |
| 5,002,288 | 3/1991 | Morrison et al. . |
| 5,026,252 | 6/1991 | Hoffelner . |
| 5,029,875 | 7/1991 | Spain et al. . |
| 5,029,876 | 7/1991 | Orlando et al. . |
| 5,066,025 | 11/1991 | Hanrahan . |
| 5,074,748 | 12/1991 | Hagle . |
| 5,076,590 | 12/1991 | Steinetz et al. . |
| 5,090,710 | 2/1992 | Flower . |
| 5,106,104 | 4/1992 | Atkinson et al. . |
| 5,110,033 | 5/1992 | Noone et al. . |
| 5,114,159 | 5/1992 | Baird et al. . |
| 5,135,237 | 8/1992 | Flower . |
| 5,174,582 | 12/1992 | Ferguson . |
| 5,176,389 | 1/1993 | Noone et al. . |
| 5,181,728 | 1/1993 | Stec . |
| 5,181,827 | 1/1993 | Pellow et al. . |
| 5,192,084 | 3/1993 | Norbury . |
| 5,201,530 | 4/1993 | Kelch et al. . |
| 5,318,309 | 6/1994 | Tseng et al. . |
| 5,335,920 | 8/1994 | Tseng et al. . |
| 5,351,971 | 10/1994 | Short . |
| 5,374,068 | 12/1994 | Jewett et al. . |
| 5,400,586 | 3/1995 | Bagepalli et al. . |
| 5,401,036 | 3/1995 | Basu . |
| 5,474,305 | 12/1995 | Flower . |
| 5,474,306 | 12/1995 | Bagepalli et al. . |
| 5,480,165 | 1/1996 | Flower . |
| 5,503,405 | 4/1996 | Jewett et al. . |
| 5,509,780 | 4/1996 | Synfelt . |
| 5,524,340 | 6/1996 | Galbraith et al. . |
| 5,597,167 | 1/1997 | Snyder . |
| 5,599,026 | 2/1997 | Sanders et al. . |

WOVEN SEALS AND HYBRID CLOTH-BRUSH SEALS FOR TURBINE APPLICATIONS

This is a divisional of application Ser. No. 08/438,228, filed May 9, 1995, which is a divisional of application Ser. No. 08/342,011, filed Nov. 16, 1994 now U.S. Pat. No. 5,474,306, which was a continuation of application Ser. No. 07/978,731, filed Nov. 19, 1992, now abandoned.

TECHNICAL FIELD

The present invention relates to seals for turbine applications and particularly relates to woven seals and hybrid cloth-brush seals for sealing between relatively moving parts in gas turbines.

BACKGROUND

Sealing is oftentimes essential when there are two relatively movable mechanical members in close proximity to one another. The members may have substantial relative motion, such as a turbine shaft against a lubricating oil reservoir, or a rotatable turbine stage relative to fixed support structure and having to withstand a pressure differential across the stage. Alternatively, there could be small vibratory pulsing motion between the members, along with thermal growth, as in sealing between a combustor and a transition piece. The resultant dynamic mismatch at typical combustor junctions requires an effective seal to contain the combustion products and a pressure differential and to allow for the dimensional growth.

More particularly, a plurality of combustors are conventionally disposed in an annular array about the axis of a turbine. Hot gases of combustion flow from each combustor through a transition piece into the first-stage nozzle. Because the transition pieces and the first-stage nozzle are formed of different materials and are subjected to different temperatures during operation, they experience different degrees of thermal growth. Thus, both the transition pieces and the first-stage nozzle support elements move radially, circumferentially and axially relative to one another as a result of thermal growth. Dynamic pulsing between these parts also occurs. This time variable mismatch at the junction of the transition pieces and the first-stage nozzle support elements requires an effective seal to contain the combustion products and the pressure differential across the space, while accommodating these dimensional changes. More particularly, the sealing devices have to conform to surfaces that have time varying characteristics, including whirl, wobble and surface undulations introduced due to wear, and must be capable of operating under high temperature conditions.

A substantial number of seals have been employed in turbine applications in the past. For example, labyrinth seals are often employed between relatively rotating parts. Labyrinth seals, however, have limitations in that they do not easily conform to vibratory movement or rotating surfaces, particularly if there are imperfections in the surfaces. Labyrinth seals have not demonstrated usefulness in non-rotary applications. Brush seals have been used in many environments, including turbines. Brush seals generally conform better to surface non-uniformities and seal better than labyrinth seals. However, they are severely limited by handling and fabrication difficulties. For example, the very fine bristle wires are not bound together before assembly and it is a formidable task to lay out a predetermined layer of bristles to the required thickness to form a bristle pack suitable to form the resulting seal. The brush seals are, thus, very expensive.

DISCLOSURE OF THE INVENTION

According to an aspect of the present invention, there is provided a cloth seal comprised of a plurality of layers of woven material, such as metal, polymer or ceramic material, which are superposed over one another, bound together along an edge in a suitable frame and from which the layers project to seal with an adjacent part. Because of the flexible nature of the layered woven material, it can conform to the surfaces of the adjacent part and form an effective seal. For example, in a seal formed between a transition piece and a first-stage nozzle element, the layers of material may be disposed in a frame and suitably secured thereto, for example, by clamping the frame, welding the material to the frame, or the like. The layers of material would project from the frame to the transition piece. As well known, the transition piece moves in a pulsed fashion having both longitudinal and transverse movements. With the free edge of the layers engaging the transition piece, an effective seal is formed between these high and low-pressure areas. The woven material along its sealing edge may have free bristles projecting from the weave, i.e., the transversely extending bristles may be spaced back from the tips of the longitudinally extending bristles whereby the latter form free bristles along the sealing edge of the woven material.

In an alternate form hereof, there is provided a hybrid woven material in combination with brush seals. For example, labors of the woven material may be interspersed with discrete bristles or brushes whereby a combination brush and woven material seal is formed.

In a further alternative form of the present invention, there is provided a dual stiffness cloth brush seal for sealing between a combustion liner and transition piece. The seal comprises a pack of long, woven metal/polymer/ceramic cloth strips having stiff bristle fibers extending in one direction and a softer, more pliable plurality of fibers extending in the orthogonal direction. The stiff bristles may be bent at an angle, for example, on the order of 10 to 30°. In use, the cloth end, i.e., the more compliant longitudinal weave, may be wrapped around the outside of the combustion liner and a metal ribbon may overlie the seal, securing it to the liner. The bristles project outwardly at the desired angle for engagement at their ends with the inside surface of the transition piece, forming a seal.

In a further embodiment of the present invention, the seal hereof may be used for shaft sealing applications where high-pressure differentials have to be tolerated. For example, the woven seal may be clamped in a backing plate, with the bristles extending radially toward and into engagement with the rotatable shaft. By providing a curved surface on the downstream low-pressure side of the seal, the wear of the bristles on the shaft can be accommodated as they bear along the curved surface. That is, as the bristles wear, the bristles bend such that the tips continue to engage the curved surface of the shaft and continue to afford a sealing function. Thus, for high pressure differentials across a sealing interface, the bristles afford a superior sealing mechanism that does not lose its effectiveness with use, particularly when the seal material, i.e., the bristles, are worn.

In a still further embodiment of the present invention, there is provided a hybrid labyrinth-brush seal particularly for sealing between a shaft and a fixed member. As well known, shaft sealing using labyrinth seals alone results in leakage past the sealing fins. Excessive wear also occurs should the labyrinth seal fins contact one another. In accordance with the present invention, a brush seal or a woven cloth with bristles extending therefrom may be clamped in a slot between the labyrinth seals. Thus, with one of the labyrinth seals serving as a backing for the brush seal, the brushes engage the rotating shaft, affording improved sealing with the brush seal, higher structural integrity and added sealing with the labyrinth. Furthermore, this type of seal can be retrofitted into existing labyrinth seals.

These forms of woven material seals or hybrid woven material/brush seals may accommodate reasonable shape variations, while offering superior sealing. They can be formed of high-temperature resistant materials and offer substantial structural integrity by tying in the fibers or bristles into a weave, yet allowing for conformity to different surface movements and undulations that other types of seals, for example, labyrinth seals, would not be able to accommodate.

In a preferred embodiment according to the present invention, there is provided a seal comprising first and second relatively moving parts, a plurality of layers of a woven material substantially overlying one another with overlying marginal portions freely engaging the first part to form a seal therewith and means for securing the layers of woven material to the second part, with the woven material of the layers thereof projecting from the second part and between the first and second parts to form a seal.

In a further preferred embodiment according to the present invention, there is provided a seal comprising first and second parts relatively rotating about an axis, at least one fin disposed on each part and projecting radially toward the other part at axially spaced positions along the parts to define a labyrinth seal between the parts and an annular array of a plurality of bristles carried by one of the first and second parts and extending generally radially toward another of the first and second parts. Means secure the bristles to the one part adjacent the fin carried thereby such that free ends thereof project from the one part for sealing engagement against another part whereby a combined labyrinth and brush seal is formed.

Accordingly, it is a primary object of the present invention to provide a novel and improved woven seal and hybrid cloth brush seals for turbine applications for sealing between relatively moving parts in a manner which accommodates differently shaped surfaces and different relative motions of moving surfaces.

BRIEF DESCRIPTION OF TEE DRAWINGS

BEST MODE FOR CARRYING OUT THE INVENTION

Reference will now be made in detail to a present preferred embodiment of the invention, an example of which is illustrated in the accompanying drawings.

Figure 1:
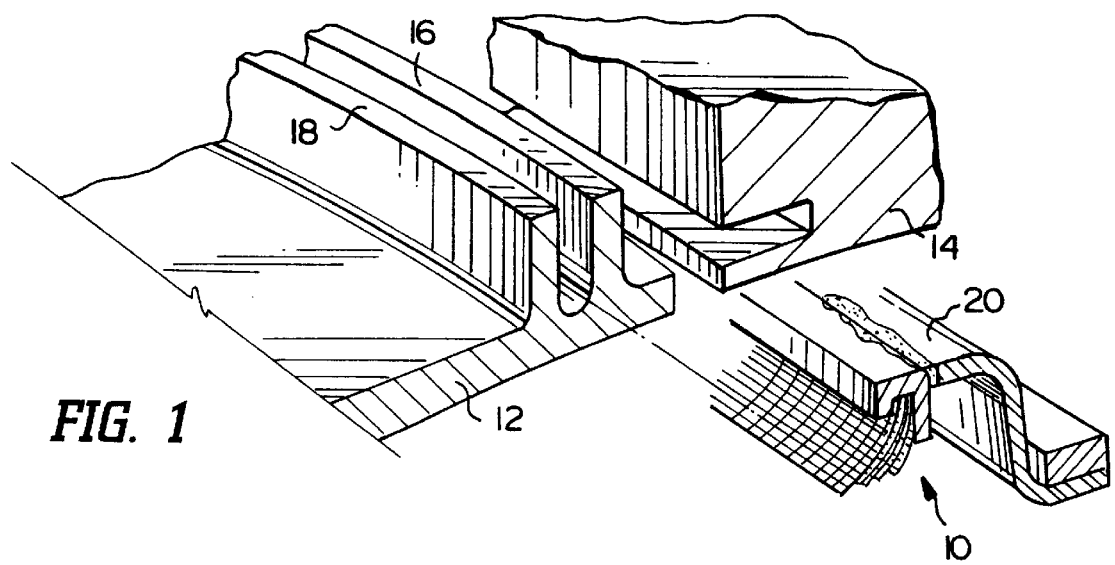
FIG. 1 is an enlarged fragmentary perspective view of a seal according to the present invention, employed between a transition piece and a first-stage nozzle in a combustor of a turbine.

Referring now to FIG. 1, there is illustrated a seal, generally designated 10, constructed in accordance with the present invention and applied to form a seal between a transition piece 12 of a combustor and a support 14 for a first-stage nozzle. It will be appreciated that the transition piece 12 and the first-stage support 14 are movable relative to one another, in this instance, the movement of the transition piece 12 may be in both longitudinal and transverse directions, as well perpendicular to those directions. The movement also may be a pulsing movement. It will be appreciated that other types of movements between relatively moving parts can be accommodated by the seal 10 of the present invention, that the seal 10 can be used in a wide variety of sealing applications, particularly for high-temperature use, and that the seal is not limited for use for sealing between the transition piece of a combustor and a support for a first-stage nozzle.

Figure 2:
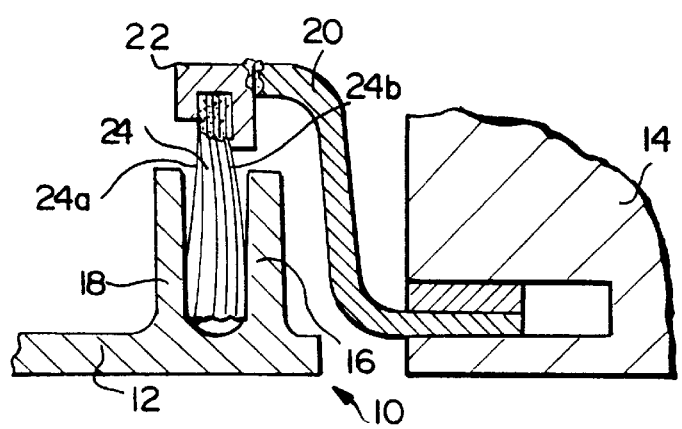
FIG. 2 is an enlarged fragmentary cross-sectional view thereof.

Referring again to FIG. 1, the transition piece 12 includes an upstanding groove formed by a pair of flanges 16 and 18 defining a slot therebetween. The first-stage nozzle support 14 has a groove for receiving one flange of a generally Z-shaped support member which supports the seal in the groove, as illustrated in FIG. 2. The support member 20 includes a channel 22 disposed on the opposite flange of the support 20 for securing the seal to the first-stage support 14 with the seal extending in the groove between flanges 16 and 18 for sealing between the transition piece and the first-stage nozzle support.

The seal 10 illustrated in FIGS. 1 and 2 comprises multiple layers 24 of woven material superposed directly one over the other. Marginal edges of the layers are suitably secured within the channel 22, for example, by welding, clamping and the like. The layers extend freely from the clamped margins thereof toward the opposite relatively movable part. Thus, the layers 24 extend freely from the margins secured to the channel 22 and in this particular application, extend within the slot formed between flanges 16 and 18. The materials constituting the warp and weft of the woven cloth may comprise metal, polymer or ceramic bristles- Where metal bristles are employed, Inconel X750 or Haynes-25 may be used. It will be appreciated that with the woven layers extending freely from the secured margins, the layers 24 can accommodate to reasonable shape variations between the relatively moving parts, while simultaneously offering substantial sealing characteristics. That is, the woven materials allow for conformity to different surface movements and undulations that other seals, for example, labyrinth-type seals, cannot accommodate. In the illustrated application of the seal 10 hereof to sealing between the transition piece and the first-stage nozzle support, the face of the woven material may seal against the flange of the slot. For example, as illustrated in FIG. 2, the forward and rear layers of the woven material, designated 24a and 24b, may bear against the flanges 18 and 16, respectively, with the free margins of the layered woven material spaced from the base of the groove. Consequently, the flexibility of the layered woven materials permits these materials to follow the movements and undulations of the relatively moving parts while simultaneously maintaining an effective seal between the parts.

The seal hereof may also comprise a hybrid between brush seals and seals formed of woven materials. For example, in FIG. 3, there is illustrated a hybrid seal of this type wherein there are provided forward and rearward layers of woven material 24c and 24d between which there is sandwiched a plurality of free bristles 28. The bristles may be employed much in the same way as brush seals are employed in the seal but between layers of woven material. The ends of the bristles are secured within the channel 22, for example, by welding, to project from the channel freely similarly with the forward and rearward woven materials 24c and 24d. Here, again, the seal may be formed by one or both of the faces of the woven material bearing against a sealing member such as the flanges 18 and 16.

Figure 3:
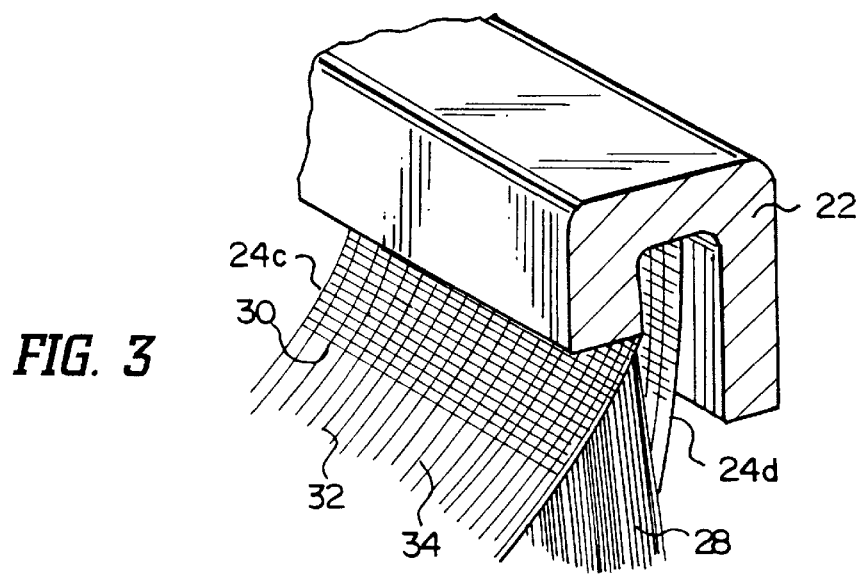
FIG. 3 is a fragmentary perspective view of a further embodiment of a seal according to the present invention.
Figure 4:
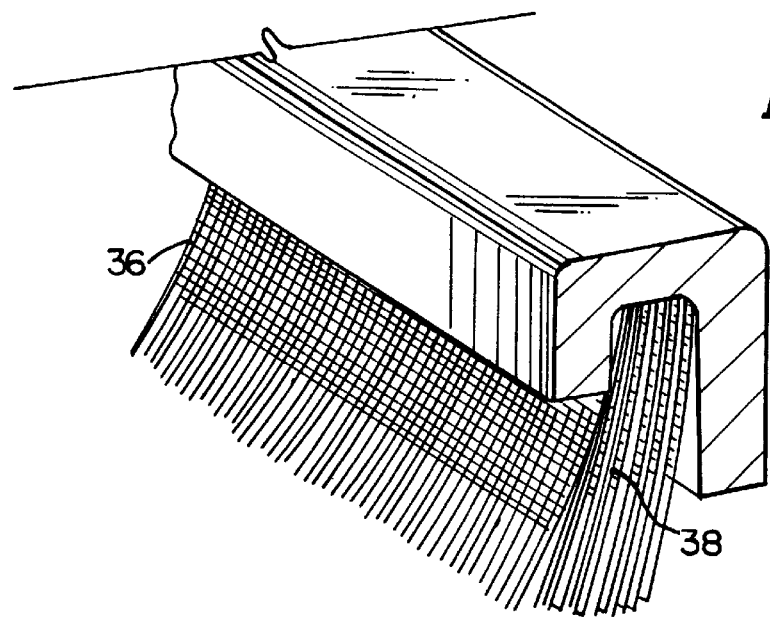
FIG. 4 is a view similar to FIG. 3 illustrating a still further embodiment of the present invention.

As illustrated in both forms shown in FIGS. 3 and 4, the bristles of the woven layers which extend in a direction parallel to the margin which is secured, may terminate short of the free edges of the perpendicularly disposed bristles in the woven layers. Thus, as illustrated in FIG. 3, the transversely extending bristles 30 in the forward layer 24c are set back from the free ends 32 of the longitudinally extending bristles 34 forming part of the woven material. In this manner, some of the advantages of standard brush seals are obtained by having the terminal portions of the longitudinally extending bristles extending freely from the woven cloth, thus affording the advantage of brush seals without the disadvantage of handling loose, free bristles during manufacture to form brush seals. It will be appreciated that the set-back of the transversely extending bristles can be used in both the layered woven materials forming the seal illustrated in FIGS. 1 and 2, as well as the hybrid woven material/brush seals illustrated in FIGS. 3–4.

Referring now to FIG. 4, there is illustrated another form of seal hereof wherein multiple layers 36 of woven materials are interspersed with free bristles 38. That is, a plurality of free bristles 38 are disposed between each adjacent pairs of woven material layers 36 in order to combine the advantages of both brush seals formed by free bristles and woven seals. In FIG. 4, the transversely extending bristles of the layers are set back from the free edge of the seal whereby the free edge of the seal is essentially formed of freely extending bristles.

Figure 5:
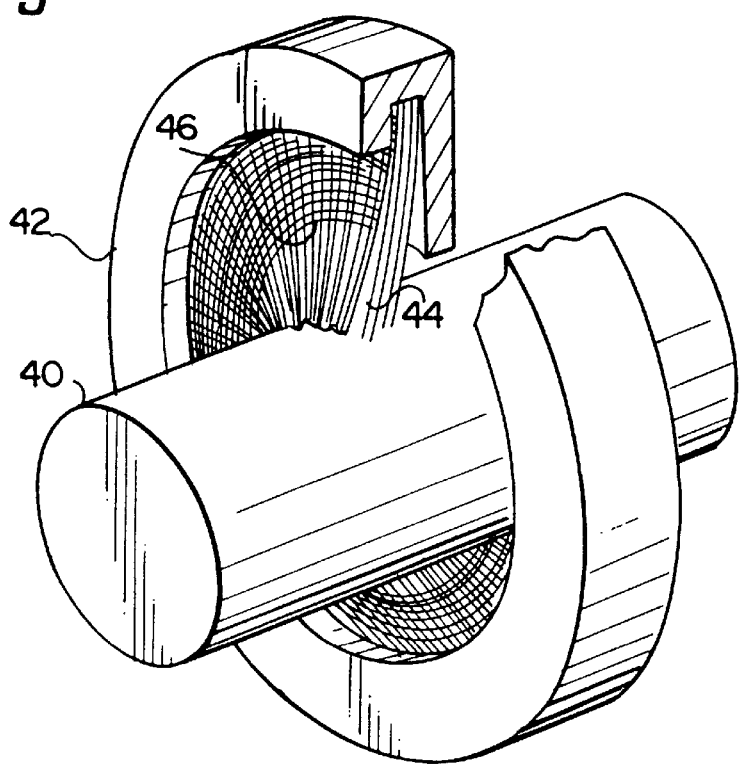
FIG. 5 is a perspective view with parts broken out and in cross-section illustrating a seal according to the present invention employed for sealing between rotating and fixed parts.

Referring now to FIG. 5, there is illustrated a seal according to the present invention, sealing between relatively rotating parts, for example, a rotating shaft 40 and a fixed frame 42. The fixed frame 42 may be in the shape of an annular channel about shaft 40. In this form, the layers of woven material are spin-woven to provide substantially radially extending bristles 44 and bristles 46 concentric about the axis of shaft 40. The bristles 46, as illustrated, may be set back from the free end of bristles 44. It will be appreciated that, while multiple layers of woven materials form the seal illustrated in FIG. 5, any one of the previously described embodiments may be used in the context of forming a seal of this type between relatively rotating parts.

It will also be appreciated that the bristles forming the woven materials may be different in gauge and type of material from one another. For example, for certain applications, it may be desirable to employ metal bristles in the woven material extending in one of the warp or weft directions, while employing a different type of material, such as a ceramic or a polymeric material extending in the other of the warp or weft directions.

Figure 6:
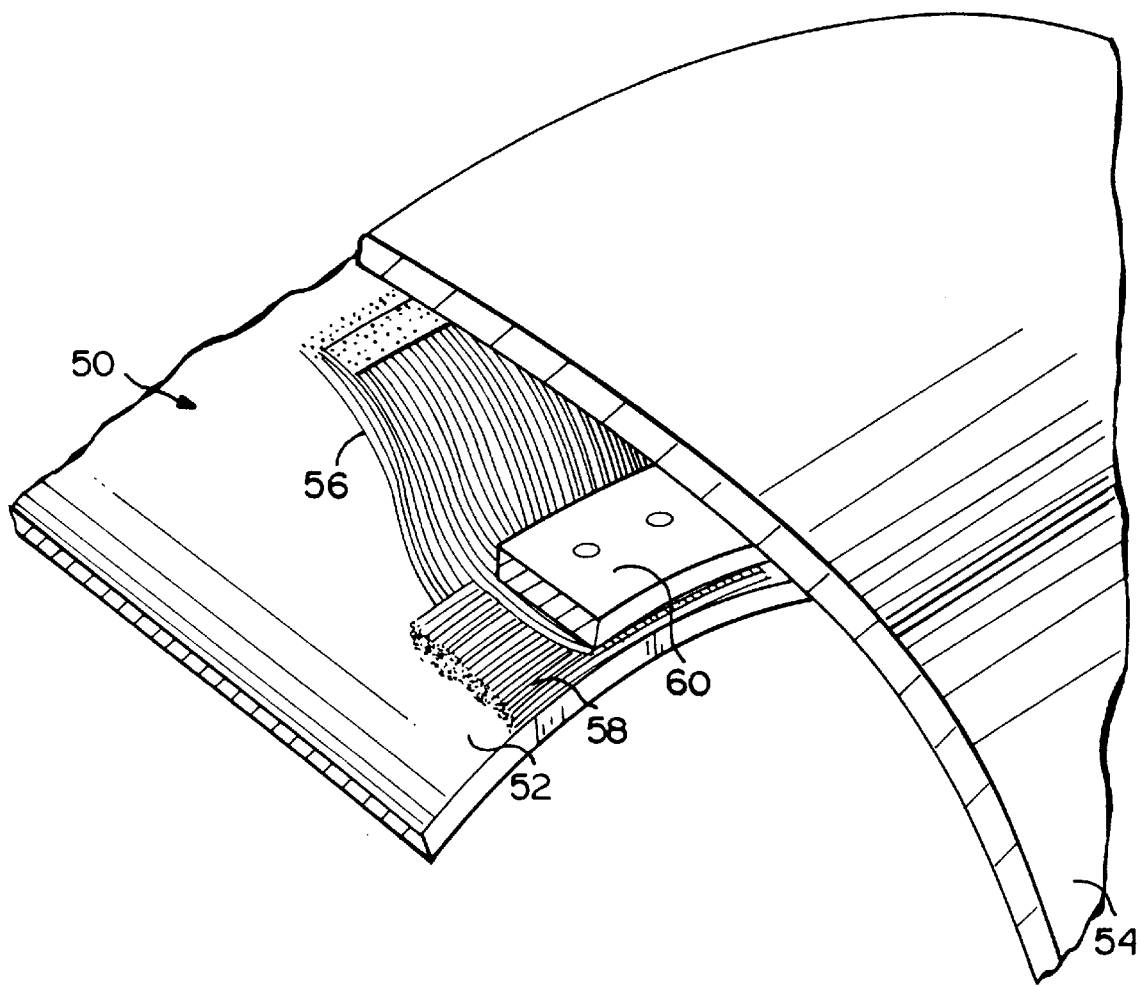
FIG. 6 is a fragmentary view of a dual stiffness cloth brush seal according to the present invention formed between a combustor liner and transition piece.

Referring now to FIG. 6, there is illustrated a cloth brush seal, generally designated 50, and specifically configured to seal the liner 52 of a combustor and a transition piece 54. In this form, the seal includes a pack of long woven metal/polymer/ceramic cloth strips comprising stiff brush bristle fibers 56 extending from a strip of woven fibers. Particularly, the fibers 56 comprise a cross-weave and fibers 58 comprise softer, more pliable fibers in an orthogonal direction, i.e., a longitudinal weave. The bristles 56 extend from the weave at an angle, for example, about 10–30°. The woven edge of the fibers is wrapped about the outside of the liner, as illustrated. A metal ribbon 60 is suitably secured, for example, by bolting or welding, to secure the seal in place with the tips of the bristles 56 projecting outwardly for engagement along the inside surface of transition piece 54. By employing a seal of this type, leakage through this joint is substantially reduced, while simultaneously permitting differential motions between the transition piece and liner and with minimum wear.

Figure 7:
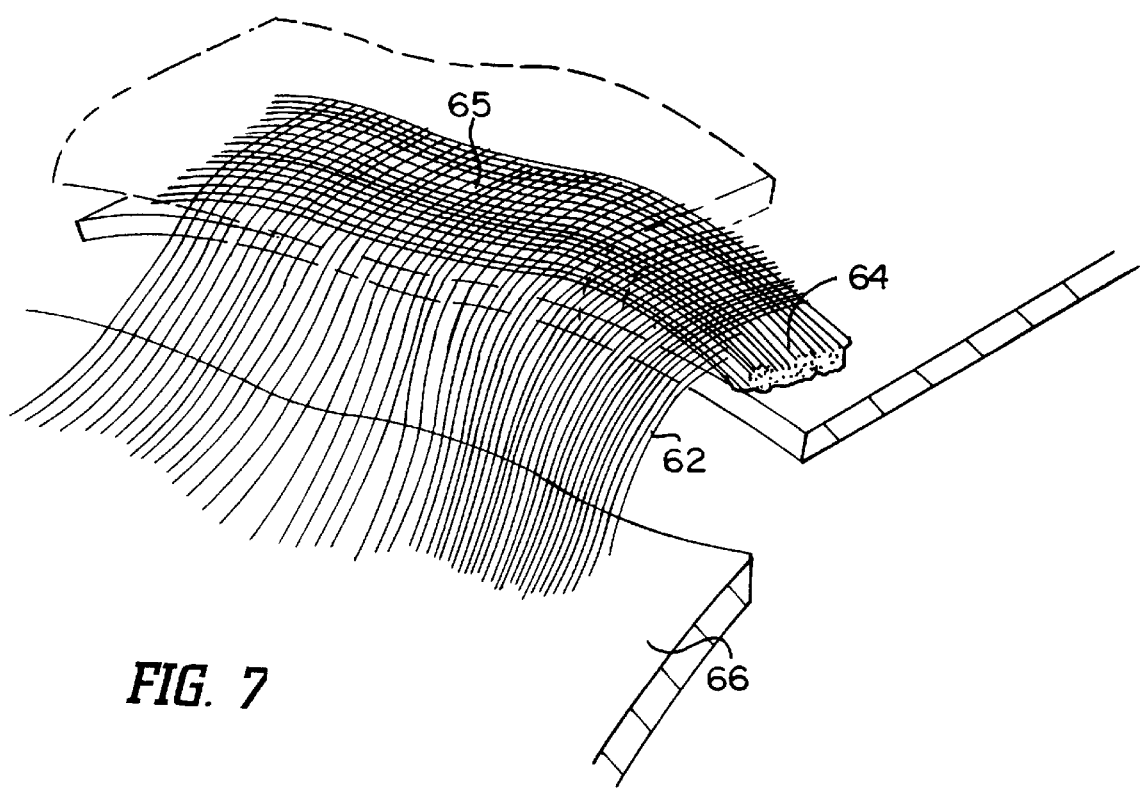
FIG. 7 is a fragmentary perspective view with parts in cross-section of a seal in accordance with the present invention between two relatively movable parts.
Figure 8:
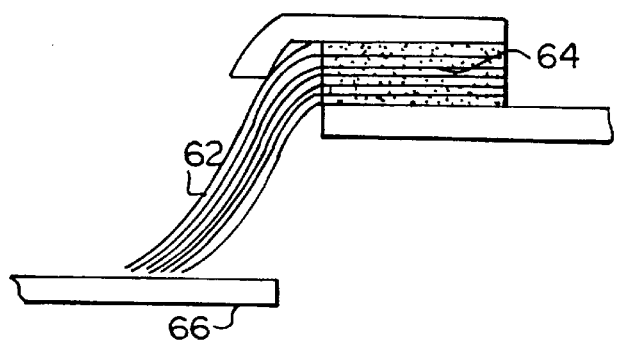
FIG. 8 is a cross-sectional view thereof.

Referring now to FIGS. 7 and 8, there is illustrated a similar seal as in FIG. 6. Particularly, a pack of woven metal/polymer/ceramic woven strips comprising stiff bristle fibers 62 extending in one direction, i.e., a cross-weave direction, and softer, more pliable fibers 64 extending in an orthogonal direction, i.e., longitudinal weave, are provided The brush bristles 62 extend from the woven part 65 of the woven strip and are held together by the weave of the strip. With the free ends of the bristles 62 projecting from the woven strip and the woven strip secured to one of the movable parts, the bristles 62 can be bent to a desired angle and cut to form a sealing contact with a mating surface. The mating surface, as illustrated in FIG. 7 at 66, can be non-uniform, i.e., wavy or undulating. This type of seal is effective to seal between substantial pressure differences, while permitting differential motions between the sealed parts. For example, this type of seal may be used between the transition piece and first-stage nozzle of a turbine. Thus, no special shapes for the seals are required in order to fit the seals for sealing engagement against variably shaped bodies and with relative motions in substantially any direction. The foregoing-described seal allows for odd shapes to be easily conformed to by a pack of such strips cut from a standard strip stock. The conformity is achieved by the relatively softer fibers of the longitudinal weave with the stiffer bristles extending orthogonally from the softer fibers, sealing in the nature of brush seals.

Figure 9:
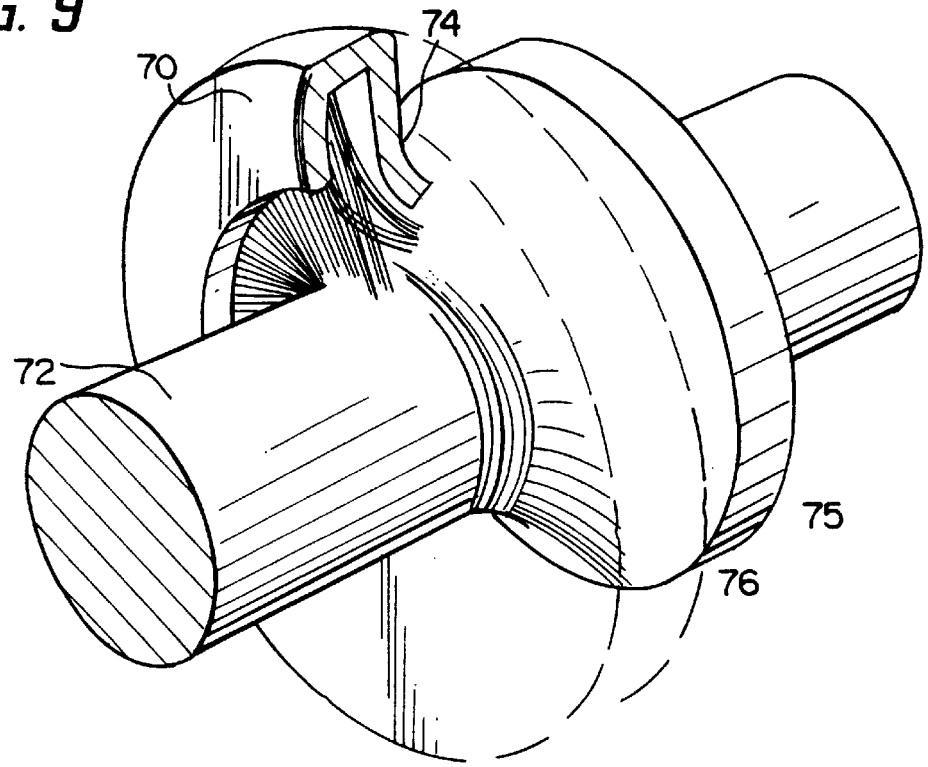
FIG. 9 is a fragmentary view of a wear compensating brush/cloth seal and shaft with parts broken out and in cross-section for ease of illustration.
Figure 10:
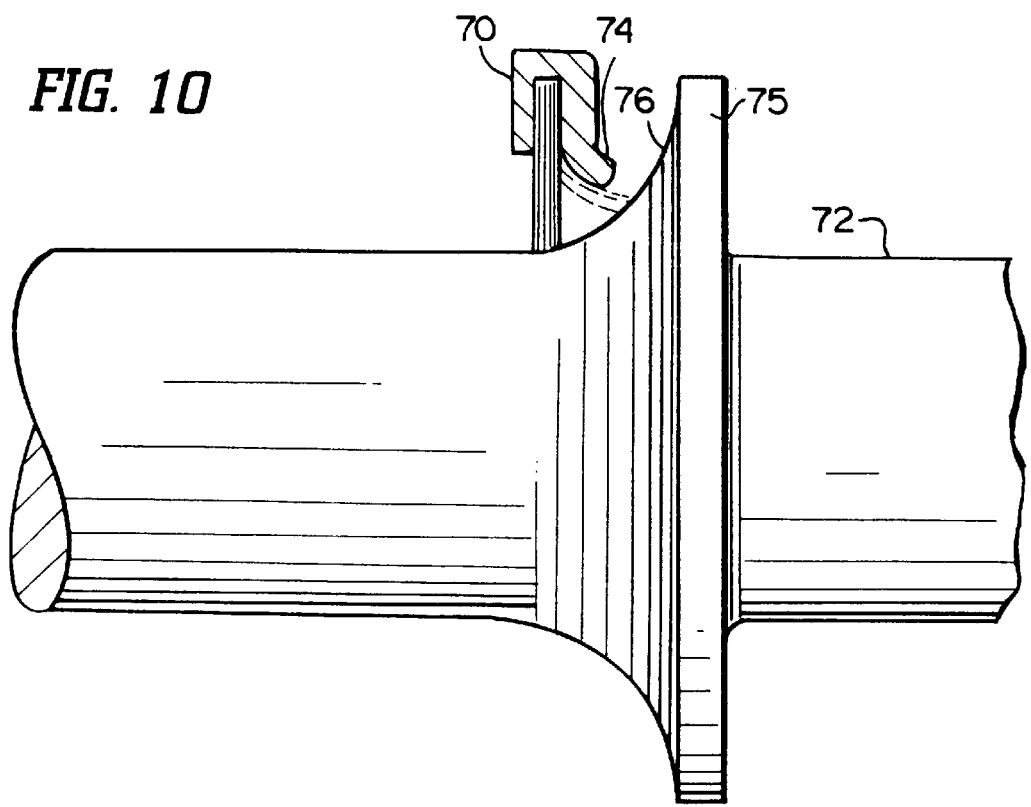
FIG. 10 is a side elevational view of the seal illustrated in FIG. 9.

Referring now to FIGS. 9 and 10, there is provided a seal for sealing across an interface having very high pressure differentials. For example, this seal may be used in inter-stage sealing in a high compression ratio compressor. Labyrinth seals have been used in these situations in the past but do not readily conform to vibrating or rotating surfaces or imperfections in those surfaces. Their effectiveness also diminishes as the pressure differential across the seal is increased. Brush seals have normal wear problems, generally resulting over time in loss of pressure and leakage. In the seal of FIGS. 9 and 10, the brush bristles or the bristles extending from the weave are held in a frame 70 and project radially inwardly such that the tips of the bristles contact the shaft 72. The frame 70 includes a flange 74 on one side to accommodate the bending of the bristles in one direction, as indicated by the dashed lines, in response to wear and differential pressure across the seal.

The shaft 72 includes a collar 75 having a curved surface 76 on the same side of the frame 70 as the flange 74. In this manner, when the tips of the bristles wear, the differential pressure causes the bristles to bear against the curved surface of collar 75 such that the tips seal against a higher point along the collar surface 76. Thus, a continuous sealing action is provided, notwithstanding wear of the brush bristles. The curvature of the surface 76 and the length of the bristles projecting from frame 70 is such that the curvature of the surface 76 increases with increasing distance away from the initial contact point of the bristles with the shaft surface. Hence, any shortening of the bristles due to wear is accommodated by the closer proximity of the curved surface 76 to the base of the bristles in frame 70.

Figure 11:
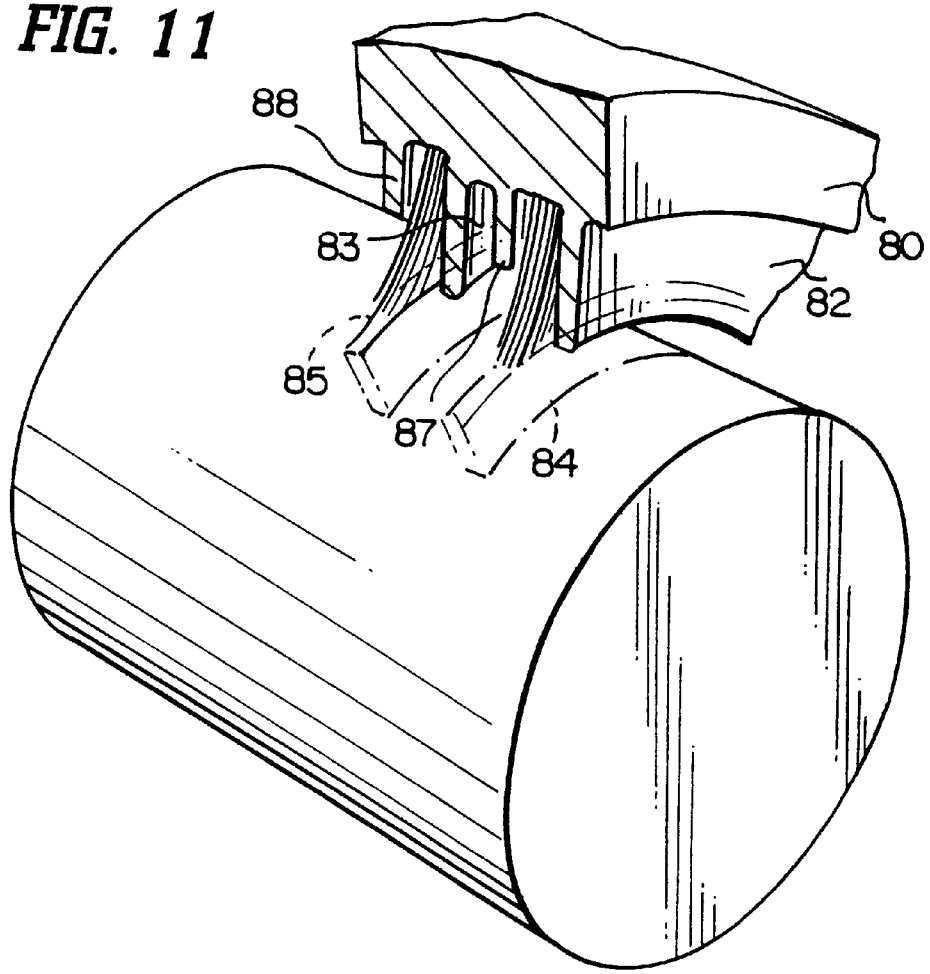
FIG. 11 is a fragmentary perspective view with parts broken out and in cross-section of a hybrid labyrinth brush seal according to the present invention.
Figure 12:
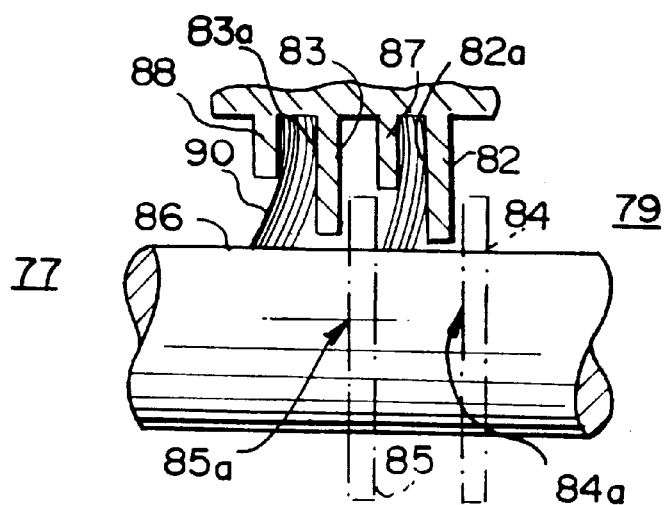
FIG. 12 is a reduced fragmentary cross-sectional view thereof.

Referring now to FIGS. 11 and 12, there is illustrated a combination hybrid labyrinth brush seal. As noted previously, labyrinth seals do not readily conform to vibrating or rotating surfaces, particularly where imperfections are extant. Brush seals conform to imperfections and seal better than labyrinths but require a backing frame. According to the present invention, there is provided a combination hybrid labyrinth brush seal which readily and easily conforms to the surfaces being sealed, while inherently providing a backing for the brush seals. Particularly, in FIG. 11, there is illustrated a labyrinth seal comprised of a sealing member 80 having sets of radially inwardly directed flanges 82 and 83 which cooperate with teeth 84 and 85 formed on shaft 86 to form a labyrinth seal. Foreshortened flanges 87 and 88 project radially inwardly from member 80 and form annular channels with flanges 82 and 83, respectively, for receiving brush seal packs 90. The radially inwardly directed tips of the brush seal packs seal against the surface of the shaft without detracting from the effectiveness of the labyrinth seals. The brush seal packs 90 are, of course, secured between the flanges 82, 87 and 83, 88, respectively. The flanges thus provide a backing for the brush seals affording structural stability to the seals.

The brush seal packs may comprise solely a plurality of bristles projecting radially from the channels. Alternately, woven seals as illustrated in FIG. 1 or hybrid woven/brush seal combinations may be used in this form of the present invention.

While the invention has been described with respect to what is presently regarded as the most practical embodiments thereof, it will be understood by those of ordinary skill in the art that various alterations and modifications may be made which nevertheless remain within the scope of the invention as defined by the claims which follow.

What is claimed is:

1. A seal assembly comprising:
   a first part rotatable about an axis and a second part surrounding said rotatable part;
   a plurality of layers of a woven material substantially overlying one another with overlying marginal portions freely engaging said first part to form a seal therewith;
   means for securing said layers of woven material to said second part, with said woven material of the layers thereof projecting from said second part and between said first and second parts to form a seal;
   at least one of said woven layers including first and second sets of bristles crossing one another in said woven layer thereof with said first set of bristles spaced back from ends of the bristles of said second set thereof to define free bristle portions of said second set of bristles extending from said first set of bristles in a plane substantially containing said one woven layer and into free sealing engagement with said first rotatable part; and
   a plurality of bristles secured adjacent one end to said second part with said bristles extending freely from said second part between at least adjacent layers of said woven material to engage said first part.

2. A seal assembly according to claim 1 wherein one of said first and second sets of bristles is formed of metal.

3. A seal assembly according to claim 1 wherein one of said first and second sets of bristles is formed of a ceramic material.

4. A seal assembly according to claim 1 wherein one of said first and second sets of bristles is formed of a polymeric material.

5. A seal assembly according to claim 1 wherein the bristles of said first set thereof are formed of a different material than the bristles of said second set thereof.

6. A seal assembly according to claim 1 wherein said woven layers are formed of different materials.

7. A seal assembly according to claim 1 wherein said first and second sets of bristles are formed of different gauge.

8. A seal assembly according to claim 1 wherein said woven layers are comprised of spin-woven bristles with a plurality of said bristles extending radially.

9. A seal assembly according to claim 8 therein said first part comprises a rotary shaft about said axis and said second part is stationary about said shaft, said first set of bristles lying concentrically about said shaft axis and said ends of the second set of bristles extending radially into free sealing engagement with said shaft.

10. A seal assembly according to claim 9 wherein said second part includes a radially projecting backing plate for said woven layers.

* * * * *